United States Patent [19]

Imura et al.

[11] Patent Number: 4,600,488
[45] Date of Patent: Jul. 15, 1986

[54] CONTROL METHOD OF MAGNETIC ANISOTROPY AND DEVICE UTILIZING THE CONTROL METHOD

[75] Inventors: Ryo Imura; Yutaka Sugita, both of Tokorozawa; Noriyuki Kumasaka, Ome, all of Japan

[73] Assignee: Hitachi, Ltd., Tokyo, Japan

[21] Appl. No.: 691,128

[22] Filed: Jan. 14, 1985

[30] Foreign Application Priority Data

Jan. 18, 1984 [JP]  Japan ................................. 59-5585

[51] Int. Cl.⁴ ............................................ C23C 15/00
[52] U.S. Cl. ................................ 204/192 N; 204/298
[58] Field of Search ................ 204/192 R, 192 N, 298

[56] References Cited

U.S. PATENT DOCUMENTS

| | | | |
|---|---|---|---|
| 3,437,734 | 4/1969 | Roman | 204/192 N |
| 3,898,952 | 8/1975 | Shirahata | 204/192 N |
| 3,929,604 | 12/1975 | Shirahata | 204/192 N |
| 4,420,386 | 12/1983 | White | 204/192 N |
| 4,525,262 | 6/1985 | Class | 204/192 N |

*Primary Examiner*—T. M. Tufariello
*Attorney, Agent, or Firm*—Antonelli, Terry & Wands

[57] ABSTRACT

There have been known various methods for controlling the magnetic anisotropy of a magnetic film with a magnetic field being applied thereto. In accordance with the present invention, the magnetic anisotropy is controlled by implanting ions into the magnetic film while applying a magnetic field thereto. The direction for applying the magnetic field can be arbitrarily selected, for example, along an inplane direction of the magnetic film and along a direction vertical thereto. The magnetic anisotropy can be controlled only in the desired areas by limiting the areas to which ions are implanted with a mask disposed on the magnetic film.

36 Claims, 17 Drawing Figures

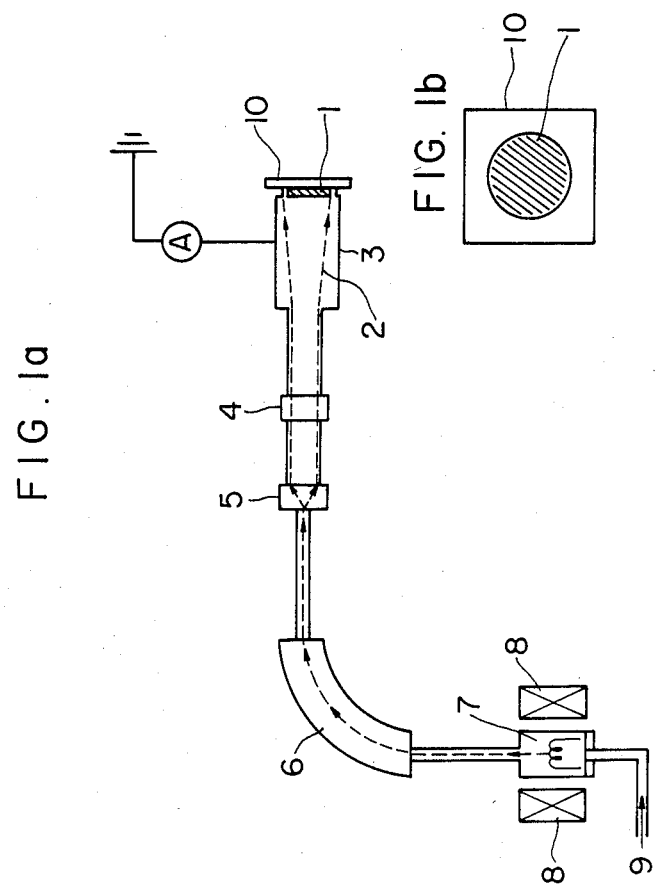

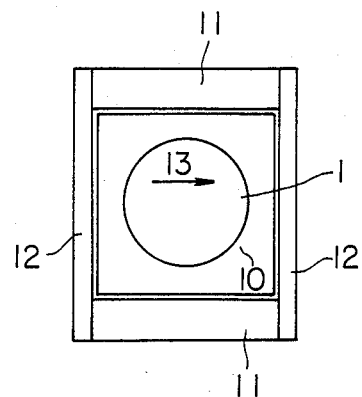
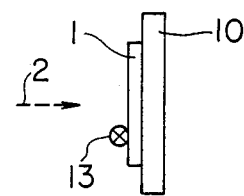
FIG. 2a  FIG. 2b
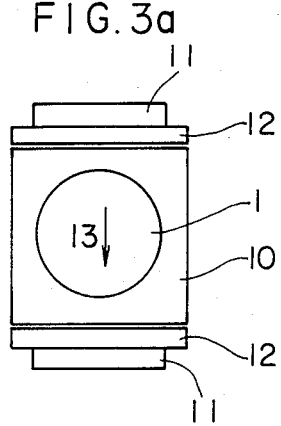
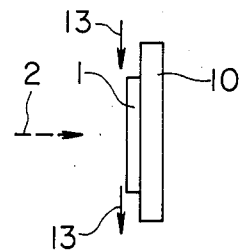
FIG. 3a  FIG. 3b

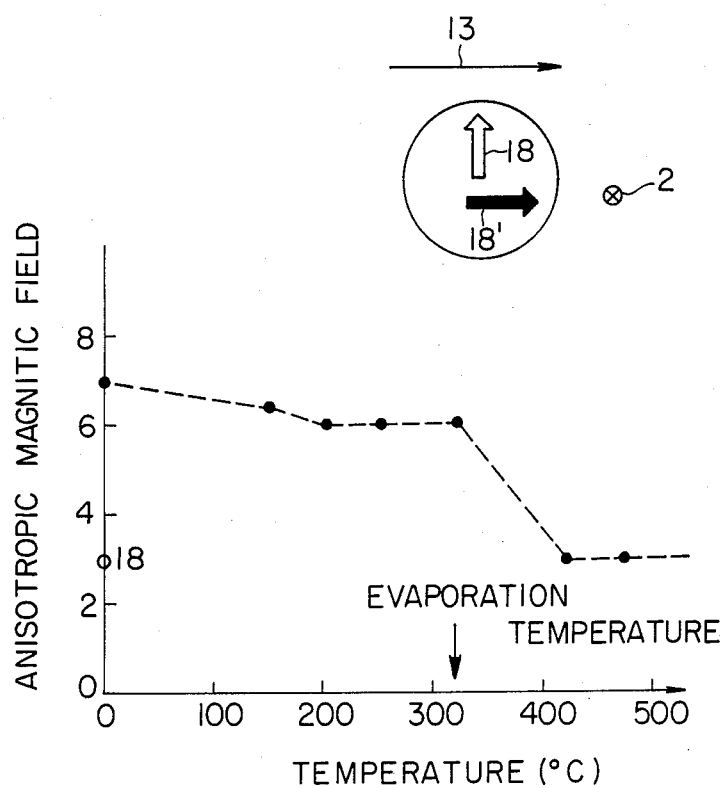

CONTROL METHOD OF MAGNETIC ANISOTROPY AND DEVICE UTILIZING THE CONTROL METHOD

BACKGROUND OF THE INVENTION

The present invention relates to a magnetic film having the magnetic anisotropy, and in particular, to a control method for controlling the magnetic anisotropy and a device utilizing the magnetic anisotropy induced by use of the control method.

Among the methods for controlling the magnetic anisotropy in a magnetic film by using a magnetic field externally applied thereto, there are utilized in-field evaporation, a magnetic annealing and quenching effect, and a magnetic annealing or heat treatment (Neel and Taniguchi; J. Phys. Radium 15 (1954), 225).

In these methods, a magnetic film is subjected to the evaporation or magnetic annealing effect in order to control such properties along a direction of an applied magnetic field (spontaneous magnetization), i.e. a specific direction, as the ordering of atoms having magnetization in the magnetic film, selective growth of precipitated atoms, and selective growth at crystal transformation, thereby inducing the magnetic anisotropy.

These well-known methods, however, induce the magnetic anisotropy by externally applying a magnetic field to a magnetic film in a range which allows diffusion of atoms in the film due to thermal energy. Consequently, it is impossible, for example, to control the magnetic anisotropy only in a desired limited portion of the film along an arbitrary direction. That is, abovementioned methods have a disadvantage that the magnetic anisotropy of the entire magnetic film is induced only along a specific direction of the applied magnetic field. In addition, as can be seen in a magnetic annealing or heat treatment, for example, a considerably long period of time and a great amount of thermal energy are required to realize a desired magnetic anisotropy by use of the thermal diffusion of atoms.

SUMMARY OF THE INVENTION

It is therefore an object of the present invention to provide a method for instantaneously controlling the magnetic anisotropy of a desired portion of a magnetic film along a desired direction, thereby removing the prior art drawbacks described above.

Another object of the present invention is to provide a device utilizing the control method for instantaneously controlling the magnetic anisotropy of a desired portion of a magnetic film along a desired direction.

Different from a method for realizing the magnetic anisotropy by use of known techniques such as the magnetic evaporation or the magnetic annealing effect, a characteristic of the present invention resides in the control method for instantaneously controlling the magnetic anisotropy of a desired portion of a magnetic film along a desired direction by conducting ion implantation on the magnetic film in a magnetic field.

Another characteristic of the present invention is a device configured in such a manner as that a magnetic sensor or an optical sensor is provided to read information from a magnetic circuit disposed in the device by using the magnetic anisotropy formed by use of the ion implantation in a magnetic field.

The present invention will be apparent from the following detailed description taken in conjunction with the accompanying drawings.

BRIEF DESCRIPTION OF THE DRAWINGS

FIG. 1a is a schematic diagram illustrating a configuration outline of an ordinary ion implantation apparatus.

FIG. 1b is a plan view of a wafer holder.

FIGS. 2a and 3a and FIGS. 2b and 3b are plan and side views, respectively, of embodiments of the present invention for explaining a case in which an external magnetic field is applied to a magnetic film along an inplane direction.

FIG. 7 is a graph demonstrating the relationships between the annealing temperature and the anisotropic magnetic field (Hk) in a case in which the ion implantation is carried out on a Ni-Fe alloy film with a magnetic field applied thereto along the difficult axis of magnetization, and thereafter the direction of the easy axis of magnetization is switched and the magnetic anisotropy is increased.

DESCRIPTION OF THE PREFERRED EMBODIMENTS

Figure 4:
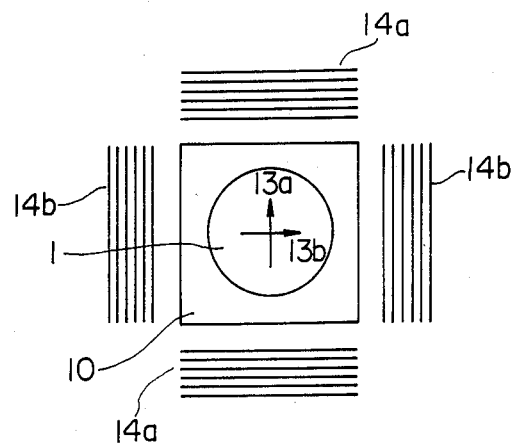
FIG. 4 is a schematic diagram of another embodiment of the present invention in which a coil is especially disposed to produce a magnetic field.

FIG. 1a outlines the configuration of a typical ion implantation apparatus. An ion beam 2 produced from an ion source 7 and which is selected by a mass analyzer 6 thereafter is scanned along x and y directions in scanners 4 and 5, respectively so as to be irradiated to a wafer 1 held by a substrate holder 10. FIG. 1b is a plan view of the wafer holder 10 on which the wafer 1 is mounted.

FIGS. 2a, 2b, 3a and 3b are schematic diagrams illustrating configurations of embodiments of the present invention in which a magnetic circuit is formed with a permanent magnet 11 and a ferrite yoke 12 along an inplane direction of the wafer 1 to which ions are irradiated. As shown in these figures, a magnetic circuit formed around the wafer 1 enables to select the applied magnetic field (spontaneous magnetization) along a desired direction in the plane of the wafer 1 installed perpendicular to the ion beam incident thereto, thereby inducing the magnetic anisotropy.

FIG. 4 illustrates an embodiment of the present invention depicting a configuration in which coils 14a and 14b for generating a magnetic field are disposed around the wafer 1 to be subjected to ion beam irradiation. As shown in this diagram, a magnetic circuit equivalent to those of FIGS. 2a and 2b and FIGS. 3a and 3b can be formed with the coils 14a and 14b disposed perpendicular to each other around the wafer 1, thus the applied magnetic field can be selectively set along a desired inplane direction of the wafer 1 so as to induce the magnetic anisotropy. When the coils orthogonal to each other are driven with a sinusoidal wave current having a phase difference of 90 degrees, a rotating magnetic field is induced in the plane of the wafer 1. As a result, a magnetic film having a considerably low magnetic anisotropy can be produced.

Figure 5A:
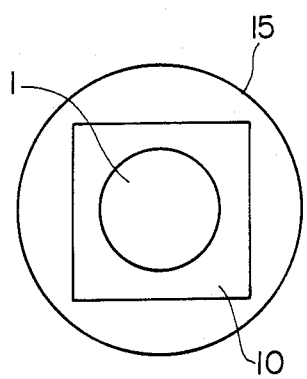
FIGS. 5a and 5b are plan and side views, respectively of still another embodiment of the present invention in which a magnetic field is particularly applied to a magnetic film along a direction perpendicular to the surface thereof.
Figure 5B:
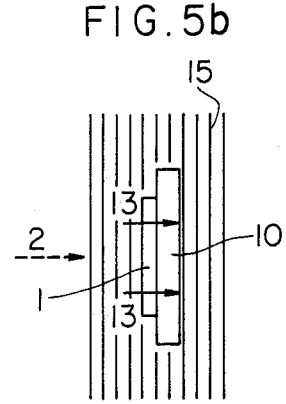

FIGS. 5a and 5b depict configurations of still another embodiment of the present invention in which a magnetic circuit is formed by a coil 15 so that the applied magnetic field is directed along the thicknesswise direction of the wafer 1, namely, to be vertical to the wafer surface. As depicted in these figures, the magnetic anisotropy can be induced along the direction vertical to the magnetic film surface by setting the applied magnetic field direction to be perpendicular to the surface of the magnetic film while the ion implantation is being conducted thereto.

Figure 6:
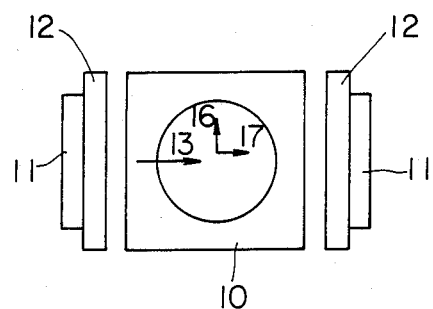
FIG. 6 illustrates still another embodiment of the present invention in which a magnetic field is applied to a magnetic film along an easy or a difficult axis of magnetization.

FIG. 6 depicts a configuration of an embodiment of the present invention in which the ion implantation is carried out, while applying an inplane magnetic field along an easy axis of magnetization 16 or along a difficult axis of magnetization 17 of a magnetic film having the magnetic anisotropy.

Table 1 outlines the results of above-stated processing performed on a Ni-Fe alloy film. The magnetic anisotropy of the magnetic film does not vary by the ion species used for the ion implantation and it increases for any ion species as outlined in Table 1. Referring to Table 1, even when the magnitude of the applied magnetic field is zero, the magnetic anisotropy is increased by the ion implantation because of the spontaneous magnetization of the magnetic film. In addition, a greater magnetic anisotropy can be induced by aligning the direction of the applied magnetic field to that of the easy axis of magnetization at ion implantation.

TABLE 1

| Ni—Fe (wt. %) | Ion species | Applied magnetic field | Anisotropic magnetic field (change in anisotropy) | |
| --- | --- | --- | --- | --- |
| 81-19 | $H_2^+$ | 0 | 3.80e → 5.50e | — |
| | | Easy axis | → 6.50e | — |
| | | Difficult axis | → 6.70e | Difficult axis → Easy axis |
| | $He^+$ | 0 | 3.0 → 7.3 | — |
| | | Easy axis | → 5.0 | — |
| | | Difficult axis | → 6.3 | Difficult axis → Easy axis |
| | $Ne^+$ | 0 | 3.9 → 5.7 | — |
| | | Easy axis | → 5.2 | — |
| | | Difficult axis | → 5.8 | Difficult axis → Easy axis |
| 70-30 | $H_2^+$ | 0 | 10.5 → 15.5 | — |
| | | Easy axis | → 22.5 | — |
| | | Difficult axis | → 14.4 | Difficult axis → Easy axis |
| 85-15 | $He^+$ | 0 | 3.4 → 12.0 | — |
| | | Easy axis | → 5.1 | — |
| | | Difficult axis | → 7.1 | Difficult axis → Easy axis |

In addition, when the direction of the applied magnetic field at ion implantation is selected to be parallel to that of the difficult axis of magnetization, the magnetic anisotropy can be increased by the ion implantation in the magnetic field with the direction of the easy axis of magnetization being switched by 90 degrees. The switching of the direction of the easy axis of magnetization can be achieved to an arbitrary direction by selecting the applied magnetic field correspondingly.

Comparing the magnetic anisotropy induction caused by the ion implantation in a magnetic field according to the present invention with that obtained by the annealing in a magnetic field, the latter necessitates a considerably long period of time and a great amount of thermal energy, whereas the former can increase anisotropy instantaneously (in several seconds), for example, by $Ne^+$ ion implantation.

FIG. 7 is a graph illustrating the effect of heat treatment on the anisotropic magnetic field Hk in which an ion implantation is performed while applying a magnetic field along the direction of the difficult axis of magnetization of a Ni-Fe alloy film, and thereby the direction of the easy axis of magnetization is switched and the magnetic anisotropy is increased. Referring to FIG. 7, an anisotropic field induced by the ion implantation in a magnetic field retains a high stability with respect to the heat treatment and develops a large value up to approximately 350° C. at which a grain-sized crystal will grow. That is, the anisotropic magnetic field induced by the ion implantation hardly changes at a temperature not exceeding the evaporation temperature (ca. 320° C. in this case) at which the magnetic film is subjected to the evaporation. In the heat treatment performed at a temperature not less than the temperature at which a grain-sized crystal will grow, the induced anisotropic magnetic field having a large value is decreased to the value to be obtained before the ion implantation. In this case, however, the direction of the easy axis of magnetization which has undergone a switching operation by the ion implantation in a magnetic field is not changed. As described above, the magnetic anisotropy induced by the ion implantation in a magnetic field is quite stable with respect to heat and is thus highly applicable to practical uses.

Figure 8A:
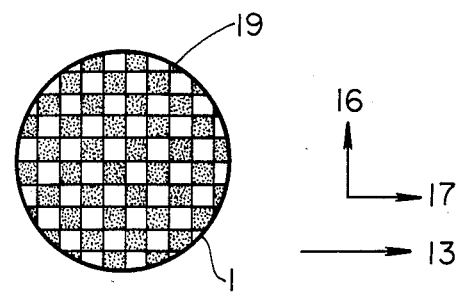
FIGS. 8a, 8b, and 11 depict other embodiments of memory devices manufactured by use of the principle in accordance with the present invention.
Figure 8B:
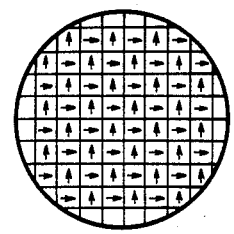

FIGS. 8a and 8b are schematic plan views illustrating an embodiment of the present invention in which a mask 19 for blocking irradiation of ions is formed on the surface of a magnetic film by use of a resist film, a metal film, or the like. In FIG. 8a, the arrow marks 16 and 17 indicate directions of the easy axis of magnetization and the difficult axis of magnetization, respectively, in the magnetic film, while arrow mark 13 represents the applied magnetic field direction at ion implantation. Referring to FIG. 8a, the difficult axis of magnetization of the magnetic film becomes to the easy axis of magnetization in the portions for which the mask layer is not provided because of above-stated switching operation when the ion implantation is performed on the magnetic film. That is, a mosaic pattern can be formed in which the magnetic anisotropy of the masked portion and that of the portion not masked are orthogonal to each other in the plane of the magnetic film. Unlike the magnetic anisotropy induced by the known magnetic evaporation or heat treatment in a magnetic field, the magnetic anisotropy induced by the ion implantation is characterized in that it can be selectively developed only in a desired limited portion of a magnetic film along an arbitrary direction.

Assuming that the areas having the orthogonal magnetic anisotropy patterns in the magnetic film of FIGS. 8a and 8b are defined to be indicated as "1" and "0", respectively, the magnetic film manufactured by the ion implantation of the present invention can be adopted as a memory device by use of a magnetic sensor or an optical sensor for reading information therefrom.

Figure 9:
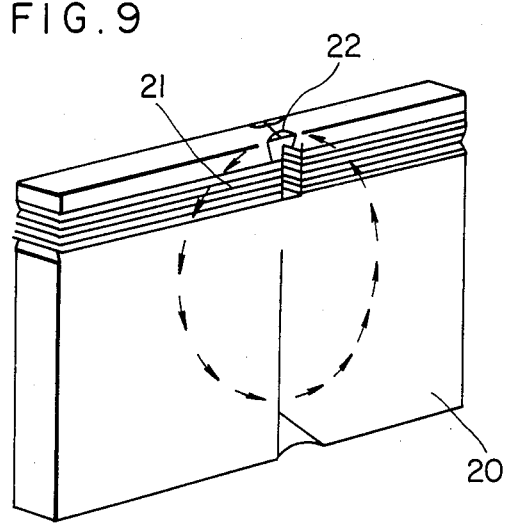
FIGS. 9 and 10 are schematic diagrams depicting the fundamental construction of a magnetic head having a large magnetic permeability produced by use of the principle of the present invention.

FIG. 9 is a fundamental configuration of a magnetic head illustrated as an embodiment of the present invention in which a high magnetic permeability is obtained by controlling the magnetic anisotropy by use of the ion implantation in a magnetic field and a mask layer formed on a magnetic film. A high magnetic permeability required for a magnetic circuit 20 of the magnetic head is used to effectively couple the magnetic flux existing between a coil 21 and a magnetic recording medium. The record/playback efficiency can be improved by increasing the sensitivity for recording and playback operations with a magnetic path having a high permeability formed in a loop or a circle as illustrated with arrow marks in FIG. 9. The magnetic path having a high permeability shown in this diagram can be generated by controlling the magnetic anisotropy (the direction of the easy axis of magnetization) to be radial in the magnetic circuit 20 through repetitious operations of the mask layer forming process and the ion implantation in a magnetic field. As a result, the ion implantation of the present invention facilitates production of a magnetic circuit having a high magnetic permeability, and a magnetic head having a high frequency response and a satisfactory efficiency can be thus obtained.

Figure 10:
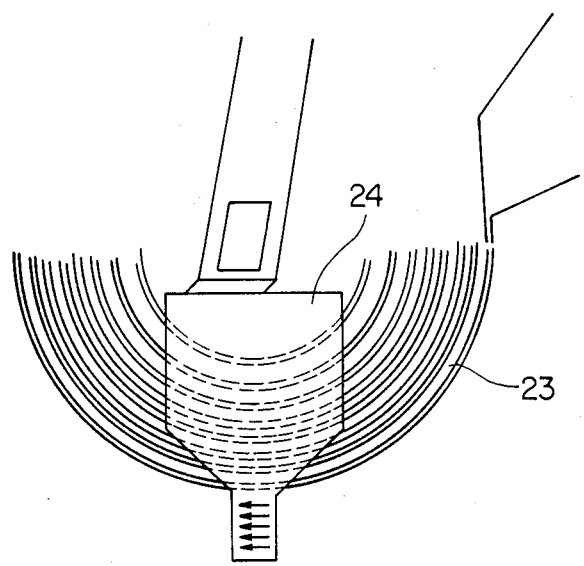

FIG. 10 is a fundamental configuration of a thin-film induced magnetic head illustrating another embodiment of the present invention in which a high magnetic permeability is developed by use of the ion implantation in a magnetic field. The switching operations of the easy axis of magnetization and the difficult axis of magnetization are advantageously carried out by use of the rotation of the induced magnetic head comprising thin films because a high frequency characteristic and a satisfactory efficiency are realized by the high magnetic permeability. This high permeability is obtained by setting the difficult axis of magnetization to be aligned to that indicated by arrow marks in this figure with respect to the magnetic anisotropy at the tip of a pole piece shown here by use of the ion implantation of the present invention. As a result, a high-performance magnetic head using thin films can be implemented which improves the switching characteristic of the thin-film induced magnetic head and solves the problems such as unstableness in its operation, a large on-track bit shift, and a poor off-track efficiency.

Figure 11:
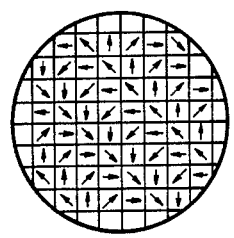

FIG. 11 is a schematic diagram of a memory device depicting an embodiment of the present invention in which the memory device is manufactured by repeating on the surface of a magnetic film the process for forming a mask layer and the ion implantation in a magnetic field. Also in a magnetic film thus manufactured, a memory device can be materialized by using a magnetic sensor or an optical sensor, wherein each of pattern areas formed by use of the ion implantation of the present invention and which develops the orthogonal magnetic pattern with each other is utilized as a unit (bit) of memory information.

Figure 12:
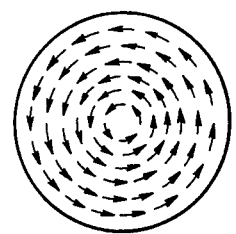
FIG. 12 illustrates an example of a magnetic film manufactured by using the control method for controlling the magnetic anisotropy in accordance with the present invention.

FIG. 12 is a schematic diagram of a magnetic film having a quite low magnetic anisotropy and which is manufactured as an embodiment of the present invention by use of the ion implantation in a rotating magnetic field in the magnetic circuit configuration of FIG. 4. As illustrated in FIG. 12, the magnetic field is rotated in the plane of the magnetic film while the ion implantation is being performed, thereby enabling to manufacture a magnetic film which is magnetically isotropic to the possible extent (magnetic anisotropy $\approx 0$). In addition, when the technique of the embodiment described in connection with FIG. 8 is combined with that of the ion implantation in a rotating magnetic field as explained hereabove, it is possible to selectively form a magnetically anisotropic area and a magnetically isotropic area in desired portions of a magnetic film.

Unlike a magnetic film manufactured by the prior art technique, the magnetic film produced by use of the ion implantation in a magnetic field in accordance with the present invention is characterized in that the magnetic anisotropy thereof can be selectively controlled along an arbitrary direction only in a desired portion; consequently, it is highly applicable to practical uses for manufacturing new devices.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A control method for controlling a magnetic anisotropy of a magnetic film comprising the steps of:
    after formation of a magnetic film having a magnetic anisotropy, applying a magnetic field to the formed magnetic film; and
    implanting ions into said formed magnetic film while said magnetic field is being applied thereto;
    whereby the magnetic anisotropy is induced along a desired direction in a desired portion of said formed magnetic film.

2. A control method in accordance with claim 1 wherein said magnetic field is applied along an inplane direction of said formed magnetic film.

3. A control method in accordance with claim 2 wherein said magnetic field is applied along a direction of an easy axis of magnetization or along the direction of a difficult axis of magnetization in the inplane direction.

4. A control method in accordance with claim 2 wherein said magnetic field is applied along two directions each perpendicular to each other in the inplane direction.

5. A control method in accordance with claim 2 wherein said magnetic field is generated by use of coils disposed around said formed magnetic film.

6. A control method in accordance with claim 5 wherein said coils are disposed to be orthogonal to each other and are driven by a sinusoidal current having a phase difference of 90 degrees.

7. A control method in accordance with claim 1 wherein said magnetic field is applied along a direction vertical to said formed magnetic film.

8. A control method in accordance with claim 2 wherein the magnetic field is applied along a direction of a difficult axis of magnetization of said formed magnetic film.

9. A magnetic device utilizing a magnetic film of which the magnetic anisotropy is controlled by implanting ions into said magnetic film, after said magnetic film has been formed, said ions being implanted with a magnetic field being applied to said formed magnetic film during the implanting.

10. A magnetic device in accordance with claim 9 wherein said magnetic device is a magnetic head utilizing said magnetic film as a magnetic member.

11. A control method in accordance with claim 1 further comprising the step of forming said magnetic film having a magnetic anisotropy, and thereafter performing said applying step.

12. A magnetic device utilizing a magnetic film having a local magnetic anisotropy along a predetermined direction in a predetermined portion thereof, said magnetic anisotropy having been induced by implanting ions through a mask of a desired pattern into a previously formed magnetic film, said ions being implanted while a magnetic field is being applied to the film.

13. A magnetic device in accordance with claim 12 wherein said magnetic device is a magnetic head utilizing said magnetic film as a magnetic member.

14. A method for controlling a magnetic anisotropy of a magnetic film having a magnetic anisotropy, the controlling being performed after formation of said magnetic film, comprising the steps of:
after formation of said magnetic film having a magnetic anisotropy, applying a magnetic field to the formed magnetic film; and
implanting ions of a non magnetic material into said formed magnetic film while said magnetic field is being applied to said film;
whereby the magnetic anisotropy in the implanted portion of said magnetic film is controlled to align along the direction of the applied magnetic field.

15. A method in accordance with claim 14 including the step of forming said magnetic film having a magnetic anisotropy prior to said applying a magnetic field.

16. A method in accordance with claim 14 wherein said magnetic field is applied along an inplane direction of said magnetic film.

17. A method in accordance with claim 16 wherein said magnetic field is applied along a direction of an easy axis of magnetization or along the direction of a difficult axis of magnetization in the inplane direction.

18. A method in accordance with claim 16 wherein said magnetic field is applied along two directions each perpendicular to each other in the inplane direction.

19. A method in accordance with claim 16 wherein said magnetic field is generated by use of coils disposed around said magnetic film.

20. A method in accordance with claim 19 wherein said coils are disposed to be orthogonal to each other and are driven by a sinusoidal current having a phase difference of 90 degrees, thereby producing an isotropic magnetic property in the implanted portion.

21. A method in accordance with claim 14 wherein said magnetic field is applied along a direction vertical to said magnetic film.

22. A method in accordance with claim 16 wherein the magnetic field is applied along a direction of a difficult axis of magnetization of said magnetic film, thereby changing the difficult axis to an easy axis of magnetization.

23. A magnetic device utilizing a magnetic film having a local magnetic anisotropy along a predetermined direction in a predetermined portion, which magnetic anisotropy has been induced by implanting non-magnetic ions through a mask of a desired pattern into a previously formed magnetic film with a magnetic field being applied to the film during the implanting.

24. A magnetic device in accordance with claim 23 wherein said magnetic device is a magnetic head utilizing said magnetic film as a magnetic member.

25. A method in accordance with claim 14 wherein said ions of a non-magnetic material are selected from the group consisting of $H_2^+$, $He^+$ and $Ne^+$.

26. A method for controlling a magnetic anisotropy of a Ni-Fe alloy magnetic film after the formation of the film, comprising the steps of:
after formation of a Ni-Fe alloy magnetic film having a magnetic anisotropy, applying a magnetic field to the magnetic film; and
implanting $Ne^{30}$ ions into said magnetic film while said magnetic field is being applied to said magnetic film;
whereby the magnetic anisotropy in the implanted portion of said magnetic film is controlled to rearrange along the direction of the applied magnetic field.

27. A method in accordance with claim 26 including the step of forming said Ni-Fe alloy magnetic film having a magnetic anisotropy, prior to said applying a magnetic field.

28. A method in accordance with claim 26 wherein said magnetic field is applied along an inplane direction of said magnetic film.

29. A method in accordance with claim 28 wherein said magnetic field is applied along a direction of an easy axis of magnetization or along the direction of a difficult axis of magnetization in the inplane direction.

30. A method in accordance with claim 28 wherein said magnetic field is applied along two directions each perpendicular to each other in the inplane direction.

31. A method in accordance with claim 28 wherein said magnetic field is generated by use of coils disposed around said magnetic film.

32. A method in accordance with claim 31 wherein said coils are disposed to be orthogonal to each other and are driven by a sinusoidal current having a phase difference of 90 degrees, thereby producing an isotropic magnetic property in the implanted portion.

33. A method in accordance with claim 26 wherein said magnetic field is applied along a direction vertical to said magnetic film.

34. A method in accordance with claim 28 wherein the magnetic field is applied along a direction of a difficult axis of magnetization of said magnetic film, thereby changing the difficult axis to an easy axis of magnetization.

35. A magnetic device utilizing a Ni-Fe magnetic film having a local magnetic anisotropy along a predetermined direction in a predetermined portion, which magnetic anisotropy has been induced by implanting $Ne^+$ ions through a mask of a desired pattern into a previously formed Ni-Fe alloy magnetic film, with a magnetic field being applied to the film during the implanting.

36. A magnetic device in accordance with claim 35 wherein said magnetic device is a magnetic head utilizing said magnetic film as a magnetic member.

* * * * *